Patented Mar. 27, 1951

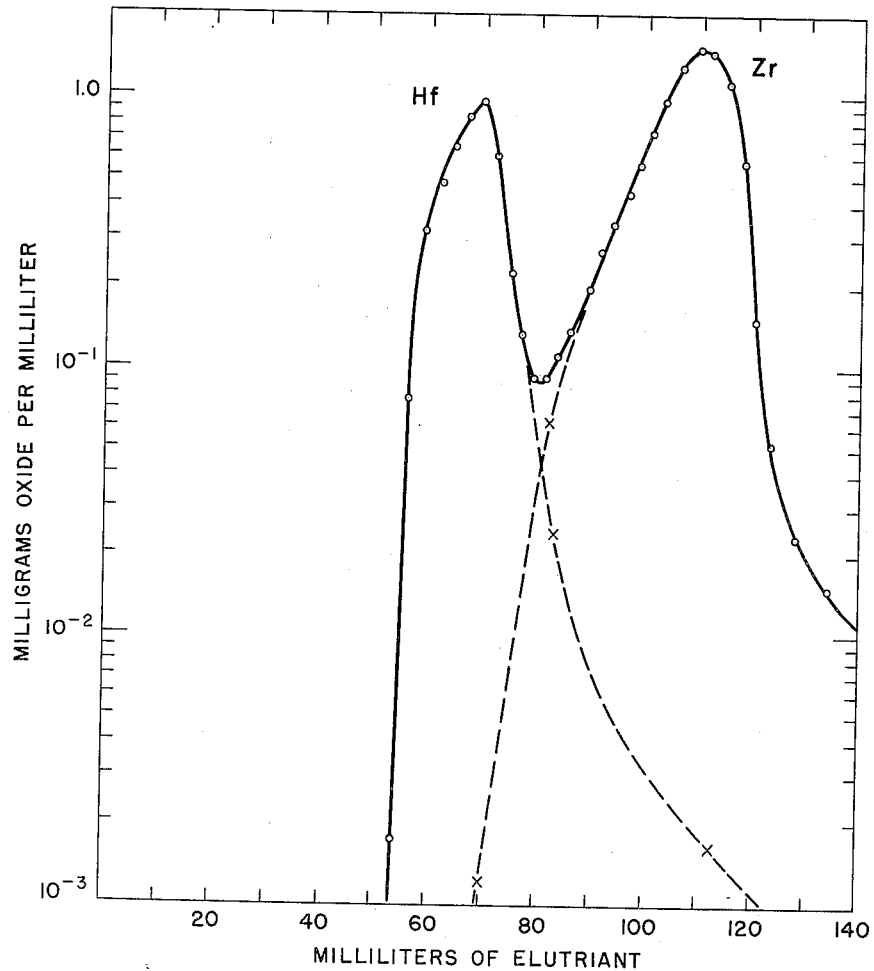

2,546,953

UNITED STATES PATENT OFFICE 2,546,953

ZIRCONIUM-HAFNIUM SEPARATION PROCESS

Kenneth Street, Jr., Berkeley, Calif., assignor to the United States of America as represented by the United States Atomic Energy Commission Application November 25, 1949, Serial No. 129,267

4 Claims. (Cl. 23—19)

The present invention relates to a process for the separation of zirconium and hafnium. More particularly, it relates to an ion exchange process for separating zirconium and hafnium from each other.

The chemistry of zirconium is remarkably similar to that of hafnium; any compound formed by the one element appears to be formed by the other, and, as a rule, the properties of the two compounds are almost identical. In fact, the resemblance is so close between corresponding compounds of zirconium and hafnium that it was not until 1923 that the presence of several percent hafnium was discovered in apparently "pure" zirconium compounds.

As a consequence of this similarity, separations of zirconium and hafnium in the past have left much to be desired from the standpoint of the time and labor required and the purities achieved. Such previous separations have, in general, made use of tedius and involved procedures like fractional precipitations and fractional crystallizations of various zirconium and hafnium compounds.

Now, it has been found that certain resins commonly known as ion exchange resins may be employed under certain conditions to effect a very efficient and inexpensive separation of zirconium and hafnium.

It is therefore a principal object of the present invention to provide a simple, practical, and efficient method of separating zirconium and hafnium from each other.

Another object of the invention is to decrease the amount of labor, materials, and time employed in the separation of zirconium and hafnium.

A further object of the invention is to utilize ion exchange resins to provide a separation of zirconium and hafnium.

Other objects and advantages will be apparent from the following description considered together with the attached drawing which comprises a graph illustrating results obtained in a typical separation of the two elements in accordance with the invention.

It has been known for some time that certain resins exhibit very pronounced and selective adsorption properties for a large number of ionic substances. Such resins are termed "ion exchange resins" and are essentially resinous materials which possess numerous reactive groups capable of exchanging their ionizable components for other ions of the same sign. Ion exchange resins are further classified as cationic and anionic exchange resins according to whether they exchange cations or anions.

Cationic exchange resins, which are particularly suited for use in the processes of the present invention, possess reactive groups such as —SO₃X, —COOX, and the like in which the ionizable components X (e. g., H⁺, NH₄⁺, etc.) is capable of being replaced by other cationic species. The treatment of a typical cationic exchange resin in the ammonium form (i. e., NH₄⁺ is the replaceable cation) with an acidic solution to convert the resin to the acid form may be represented by the following equation:

$$RSO_3NH_4 + H^+ = RSO_3H + NH_4^+$$

where R represents the inert resin exclusive of the reactive group (—SO₃⁻).

A sulfonated polymerizate of a poly vinyl aryl compound, similar to those described in U. S. Patent 2,366,007 (G. F. D'Alelio, August 11, 1942), has been found to be well suited for use as an adsorbent in the present invention. Resins of this type are remarkably stable and possess a great number of reactive groups, and, as a consequence, have high adsorptive properties.

In general, separation processes using ion exchange resins comprise adsorbing the ions to be separated on an ion exchange resin and thereafter selectively eluting the ions from the resin. More specifically, a solution of ions to be separated is passed through a column of finely divided exchange resin under such conditions that the ions are removed from the solution and adsorbed on the resin by undergoing ion exchange with the resin. An eluting solution, characterized by forming complexes of differing stability with each ion, is then passed through the column. Since there will exist a competition between the resin and eluting solution for each ion, providing the flow rate of the eluting solution is not too high, each ion will go through many resin-solution equilibria as it passes down the column. In this respect, the operation of an ion exchange column may be considered to be analogous to the operation of an efficient fractionating column wherein the many equilibrium stages give a large enough magnification of minute component differences to make possible the separation of components with almost identical properties.

The rate at which each of the ions moves down the column upon elution will, in general, depend upon the stability of the resin-held ion relative to the stability of the same ion in the eluting solution. Since these stabilities will be different for each ion, a separation of the different ions into bands will be effected as they travel down the column. Separate fractions of the eluting solution, each enriched in a particular constituent, may thus be collected. Moreover, the nature of the eluting agent and the conditions of operation of the column are specific and critical with respect to the separation of zirconium and hafnium.

I have found it advantageous in the practice of my invention to equilibrate a separate portion of cationic exchange resin with a solution containing hafnium and zirconium, instead of adsorbing the said elements by passage of a solution containing them through a column of resin as described above. (However, this latter procedure may be used if desired.) More specifically, a cationic exchange resin is first slurried with a perchloric acid solution and then quantities of a mixture of hafnium and zirconium, preferably as their oxychlorides, are added with thorough stirring to the slurry. The resulting equilibrated resin slurry is then placed on top of a column previously packed with the same resin in the acid form (i. e., H+ is the replaceable cation). It is readily apparent that in this method of adsorption the adsorbed hafnium and zirconium are located in a rather sharply defined region, namely the column volume occupied by the equilibrated portion of the resin.

Enough resin should be used in the equilibration step to insure that the adsorption capacity of the resin is sufficient to allow for maximum adsorption of the ionic materials. The resin should be finely divided to present the maximum surface to the solution, care being taken to keep the particle size from being so small as to cause the resin to pack "solid" and inhibit the flow of solutions through the column. A particle size corresponding to U. S. mesh 250–500 has been found to be satisfactory.

It has been found that aqueous hydrochloric acid solutions are suitable for the elution of the hafnium and zirconium from the resin column, the hafnium being eluted first. Excellent separations have been achieved using concentrations of hydrochloric acid in the range 5.5–6 molar and a flow rate of acid through the column of 0.1–0.3 ml./cm.$^2$/min. As the concentration of the acid is raised above 6 molar, the hafnium and zirconium tend to come off together. At lower concentrations of acid (down to 3 molar), a separation of hafnium and zirconium is still achieved, but the time required to remove the elements from the column becomes long.

The following example, involving milligram quantities of material, illustrates the process of my invention and its applicability to the production of significant amounts of pure hafnium and zirconium.

Example

Thirty-five mg. of zirconium oxide and 15 mg. of hafnium oxide were dissolved in a mixture of sulfuric and hydrofluoric acids, hafnium and zirconium tracer (Hf$^{181}$ and Zr$^{95}$) added, and the mixture fumed to dryness. The residue was taken up in concentrated hydrochloric acid and the hydroxides precipitated with ammonium hydroxide and washed. The hydroxides were again dissolved in hydrochloric acid and the oxychlorides crystallized by evaporation. One c. c. of 250 to 500 mesh Dowex 50 spheres (a cationic exchange resin of the type described above) in the ammonium form, were suspended in 30 c. c. of 2 M perchloric acid and the mixed oxychlorides added a few mg. at a time over a period of 15 minutes, the mixture being continually agitated by bubbling air through it. Under these conditions, i. e., approximately 0.01 M zirconium and hafnium in 2 M perchloric acid, the zirconium and hafnium are not appreciably polymerized and about 80% of each is adsorbed by the resin. The slurry of resin was placed on the top of an ion-exchange column 1 sq. cm. in area and 30 cm. long which previously had been packed with the same resin and washed with 6 M hydrochloric acid to convert it to the acid form. On elution with 6 molar hydrochloric acid at a flow rate of approximately 0.1 ml./cm.$^2$/min., the elution curve shown in the attached drawing was obtained. The outline of the curve was obtained by counting the tracers (Zr$^{95}$ and Hf$^{181}$) and the dotted portions by optical spectrographic analysis. The use of the radioactive tracer technique greatly simplified the determination of the eluate fractions containing the separated hafnium and zirconium. It can be seen by graphical integration of the area under the aforementioned curve that approximately 10 mg. of hafnium (as HfO$_2$) containing less than 0.1% ZrO$_2$ was obtained in the eluate fraction from 53 ml. to 72 ml. In the eluate fraction from 86 ml. to 140 ml. approximately 28 mg. of Zr (as ZrO$_2$) was obtained containing less than 0.5% HfO$_2$.

The term "eluate" or its equivalent, as used herein, is intended to include any effluent bearing a desired product from a bed of adsorbent.

The term "eluting agent," "elutriant," or equivalent, is intended to include a material which removes adsorbed material from a bed of adsorbent.

The term "adsorption" is utilized in referring to removal of components from solutions by a solid material.

While the salient features of this invention have been described in detail with respect to one embodiment it will, of course, be apparent that numerous modifications may be made within the spirit and scope of this invention and it is not therefore desired to limit the invention to the exact details except insofar as they may be defined in the following claims.

What is claimed is:

1. In a method for separating the elements zirconium and hafnium from each other, the steps comprising contacting an aqueous solution containing said elements in ionic form with a cationic exchange resin, selectively eluting said elements from said resin with a hydrochloric acid solution wherein the concentration of the hydrochloric acid is in the range of about 3 to 6 molar, and collecting fractions of the eluate containing the separated elements.

2. In a method for separating the elements zirconium and hafnium from each other, the steps comprising equilibrating a mixture of said elements in ionic form with an acidic slurry of a cationic exchange resin, placing said equilibrated resin slurry containing the adsorbed zirconium and hafnium upon a column partially filled with the same resin in the acid form, eluting said elements from said resin-filled column with a hydrochloric acid solution wherein the concentration of the hydrochloric acid is in the range of about 3 to 6 molar, and collecting fractions of the eluate containing separate said eluted elements as fractional products.

3. In a method for separating the elements zirconium and hafnium from each other, the steps comprising equilibrating a mixture of said elements as their oxychlorides with a perchloric acid slurry of a cationic exchange resin, placing said equilibrated resin slurry containing the adsorbed zirconium and hafnium upon a column partially filled with the same resin in the acid form, eluting said elements from said resin-filled column with a hydrochloric acid solution wherein the concentration of the hydrochloric acid is in the range of about 3 to 6 molar, and collecting fractions of the eluate containing said eluted elements as separate fractional products.

4. In a method for separating hafnium and zirconium by means of a cationic exchange resin, the step comprising eluting the adsorbed zirconium and hafnium with a hydrochloric acid solution having a concentration in the range of about 3 to 6 molar.

KENNETH STREET, Jr.

REFERENCES CITED

The following references are of record in the file of this patent:

Kraus, K. A. and Moore, G. E., Journal American Chemical Society, 71, 1949, page 3263.

Street, Kenneth, Jr., and Seaborg, G. T., Journal American Chemical Society, 70, 1948, pages 4268-9.